(12) United States Patent
Spitz et al.

(10) Patent No.: US 11,671,246 B2
(45) Date of Patent: Jun. 6, 2023

(54) DATA PROVISIONING DEVICE FOR PROVISIONING A DATA PROCESSING ENTITY

(71) Applicant: Secure Thingz Ltd., Cambridge (GB)

(72) Inventors: Stephan Spitz, Karlsfeld (DE); Haydn Povey, Cambridge (GB)

(73) Assignee: Secure Thingz Limited, Cambridge (GB)

( * ) Notice: Subject to any disclaimer, the term of this patent is extended or adjusted under 35 U.S.C. 154(b) by 254 days.

(21) Appl. No.: 17/083,785

(22) Filed: Oct. 29, 2020

(65) Prior Publication Data

US 2021/0135852 A1  May 6, 2021

(30) Foreign Application Priority Data

Oct. 30, 2019  (EP) ..................................... 19206276

(51) Int. Cl.
| | | |
|---|---|---|
| *H04L 9/08* | (2006.01) | |
| *H04L 9/32* | (2006.01) | |
| *H04L 9/40* | (2022.01) | |

(52) U.S. Cl.
CPC .......... *H04L 9/0819* (2013.01); *H04L 9/3263* (2013.01); *H04L 63/0428* (2013.01); *H04L 63/06* (2013.01); *H04L 2209/60* (2013.01)

(58) Field of Classification Search
None
See application file for complete search history.

(56) References Cited

U.S. PATENT DOCUMENTS

| 9,064,117 | B1 | 6/2015 | Worsley |
|---|---|---|---|
| 10,387,687 | B2 * | 8/2019 | Boehl ................. G06F 11/3608 |
| 11,108,627 | B2 | 8/2021 | Smith et al. |

(Continued)

FOREIGN PATENT DOCUMENTS

| CA | 2707232 A1 * | 8/2009 | ........... H04L 9/3234 |
|---|---|---|---|
| CN | 1722819 A | 1/2006 | |

(Continued)

OTHER PUBLICATIONS

Extended Search Report from corresponding EP Application No. EP19206276.8, dated Apr. 16, 2020.

(Continued)

*Primary Examiner* — Michael Pyzocha
(74) *Attorney, Agent, or Firm* — Workman Nydegger

(57) ABSTRACT

A data provisioning device is arranged for provisioning a data processing entity from a set of data processing entities sharing the same joint decryption key. The data provisioning device comprises: a network interface configured to receive the provisioning data for provisioning the data processing entity, a joint encryption key associated with the joint decryption key, and control information indicating a processing scheme to be deployed by the data provisioning device when provisioning the data processing entity; a processor configured to process the provisioning data according to the control information to obtain processed provisioning data, to cryptographically encrypt the processed provisioning data using the received joint encryption key to obtain encrypted processed provisioning data; and a device interface configured to transmit the encrypted processed provisioning data to the data processing entity.

14 Claims, 5 Drawing Sheets

(56) References Cited

U.S. PATENT DOCUMENTS

| | | |
|---|---|---|
| 11,128,528 B2 | 9/2021 | Nolan et al. |
| 11,196,623 B2 | 12/2021 | Smith et al. |
| 2013/0267164 A1 | 10/2013 | Kodama et al. |
| 2014/0137230 A1 | 5/2014 | Benari et al. |
| 2014/0189362 A1 | 7/2014 | Van Den Broeck et al. |
| 2015/0106911 A1* | 4/2015 | Benari ............... H04L 41/0806 726/12 |
| 2015/0229475 A1 | 8/2015 | Benoit et al. |
| 2017/0061128 A1* | 3/2017 | Novak ................. G06F 21/575 |
| 2017/0346641 A1* | 11/2017 | Medvinsky ......... H04L 63/0435 |
| 2017/0353859 A1* | 12/2017 | Idnani .................. H04W 12/08 |
| 2018/0063104 A1 | 3/2018 | Manges |
| 2018/0097639 A1 | 4/2018 | Gulati et al. |
| 2018/0098218 A1* | 4/2018 | Fogle-Weekley ....... H04L 63/08 |
| 2018/0137261 A1* | 5/2018 | Lattin .................. G06F 21/572 |
| 2018/0167208 A1* | 6/2018 | Le Saint ............... H04L 9/0844 |
| 2018/0248694 A1 | 8/2018 | Benoit et al. |
| 2018/0375665 A1* | 12/2018 | Contenti ............... H04W 12/50 |
| 2019/0118767 A1* | 4/2019 | Britt ...................... H04L 67/125 |
| 2019/0200193 A1* | 6/2019 | Bae ....................... H04W 8/005 |
| 2019/0207813 A1 | 7/2019 | Uehara et al. |
| 2019/0349190 A1 | 11/2019 | Smith et al. |
| 2019/0349254 A1 | 11/2019 | Nolan et al. |
| 2019/0349261 A1 | 11/2019 | Smith et al. |
| 2019/0349426 A1 | 11/2019 | Smith et al. |
| 2019/0349433 A1 | 11/2019 | Smith et al. |
| 2019/0349733 A1 | 11/2019 | Nolan et al. |
| 2019/0356482 A1* | 11/2019 | Nix ..................... H04L 63/0823 |
| 2019/0372780 A1* | 12/2019 | Messerges ............ H04L 9/3263 |
| 2020/0356701 A1* | 11/2020 | Pruss ..................... G06F 21/78 |
| 2020/0359212 A1* | 11/2020 | Chen .................... H04L 9/3271 |
| 2021/0126826 A1 | 4/2021 | Nolan et al. |
| 2021/0135852 A1* | 5/2021 | Spitz ...................... H04L 67/34 |

FOREIGN PATENT DOCUMENTS

| | | |
|---|---|---|
| CN | 104025542 A | 9/2014 |
| CN | 105246071 A | 1/2016 |
| TW | 201520819 A | 6/2015 |
| TW | 201835784 A | 10/2018 |
| TW | 201921890 A | 6/2019 |

OTHER PUBLICATIONS

Office Action from corresponding Taiwanese Application No. 11021090530, dated Nov. 5, 2021.

Office Action from corresponding Taiwanese Application No. 109137223, dated May 20, 2022.

Office Action from Chinese Application No. 202011173612.2, dated Feb. 17, 2023.

* cited by examiner

DATA PROVISIONING DEVICE FOR PROVISIONING A DATA PROCESSING ENTITY

TECHNICAL FIELD

In general, the present invention relates to the field of device provisioning, in particular in the field of Internet of Things (IoT).

BACKGROUND

In modern IoT systems, a high number of data processing entities can be deployed to order to perform various tasks such as measuring and distributing measured data. However, the data processing entities shall be provisioned before starting operations. The term provisioning relates to providing any kind of data to the data processing entities such as cryptographic keys, operating system code, in particular firmware, parameter defining a functionality of a data processing entity such a data transmission schedule, or device identification.

Typically, provisioning is performed in a secure environment, such as in a secure building or with a wired and thus secured connection between a data processing entity to be provisioned and a provisioning data source, wherein the provisioning data source and a data processing entity are directly connected at the moment of provisioning together.

However, with the increasing number of data processing entities to be provisioned for e.g. IoT operations, a direct connection between a provisioning data source and the data processing entities in a secure environment cannot always be provided.

In light of the above, there is a need for more flexible approach for provisioning data processing entities.

SUMMARY

It is an object of the invention to provide a more flexible approach for provisioning data processing entities.

The foregoing and other objects are achieved by the subject matter of the independent claims. Further implementation forms are apparent from the dependent claims, the description and the figures.

The invention is based on the finding that the above object can be solved by a distributed provisioning approach, where the provisioning data source and the data processing entities to be provisioned are not connected to each other while the provisioning is performed and thus can permanently be separated from each other. Such a separation can be achieved by a separate data provisioning device that is included into the provisioning chain between a data provisioning source and the data processing entities. Thereby, a secure environment in which the data provisioning source and the data provisioning devices to be provisioned shall be arranged for provisioning is not necessary.

According to a first aspect, the invention relates to a data provisioning device for provisioning a data processing entity from a set of data processing entities, with at least one or more data processing entities, sharing the same joint decryption key, the data provisioning device comprising a network interface, the network interface being configured to receive the provisioning data for provisioning the data processing entity, a joint encryption key being associated with the joint decryption key, and control information, the control information indicating a processing scheme to be deployed by the data provisioning device when provisioning the provisioning data, a processor being configured to process the provisioning data according to the control information to obtain processed provisioning data, to cryptographically encrypt the processed provisioning data using the received joint encryption key to obtain encrypted processed provisioning data, and a device interface being configured to transmit the encrypted processed provisioning data to the data processing entity.

The data processing entity is a separate entity and does not form any part of the data provisioning device. The data processing entity can be any processing entity that is capable of digitally processing data. Examples of data processing entities include IoT entities such as sensors etc.

The processing scheme can indicate one or more of the following: number of data processing entities in the set of data processing entities to be provisioned, identity information relating to each data processing entity, data portion(s) in the received provisioning data intended only for one data processing entity, an individual encryption key for individually encrypting data or data portions for the respective data processing entity.

The joint decryption key is identical for all data processing entities, so that only one encryption key can be used for secure communications between the data provisioning device and the data processing entities. The joint decryption key and the encryption key form a cryptographic key pair, e.g. a public key and a private key of an asymmetric cryptographic scheme. However, the joint decryption key and the encryption key can be cryptographic keys according to a symmetric cryptographic scheme as well.

The term "provisioning" relates to transmitting encrypted and processed provisioning data to the data processing entity.

The provisioning data can be transmitted to the data provisioning device from a remote data provisioning source such as a remote server over a communication network, such as TCP/IP communication network, which can be a wireless, wired or optical communication network.

The split-up of the provisioning data source and the data processing entity to which data is provisioned is covered by the data provisioning device forming therefore a Universal Provisioning Device (UPD). This split up can be provided locally but a time-wise separation via a the UPD can be deployed as well. As the UPD breaks up end-to-end security it may form or contain an own Hardware Security Module (HSM) for creating a local secure endpoint.

According to an example, the network interface is arranged for network communications according to a network protocol, in particular TCP or IP protocol, and/or wherein the device interface is arranged for device-to-device communications, in particular as a JTAG or an USB interface or as a bus interface, in particular as a serial bus interface.

The network interface can be a wireless network interface arranged for wireless communications, e.g. according to the 5G communication technology.

The network interface and the device interface are according to an example different and/or separate interfaces. Thereby, a direct communication between the data provisioning source and the data processing entity can be prevented.

In an example, the device interface is a wired interface. Thereby, a direct communication between the data provisioning source and the data processing entity can be prevented.

According to an example, the provisioning data comprises a public key certificate, in particular a root of trust certificate according to a public key infrastructure, jointly identifying all data processing entities in the set of data processing entities, and wherein the processor is configured to cryptographically encrypt the processed provisioning data using the public key certificate with the received cryptographic encryption key to obtain the encrypted processed provisioning data.

According to an example, the data processing entity comprises an individual decryption key assigned only to the data processing entity, wherein the network interface is configured to further receive an individual encryption key associated with the individual decryption key of the data processing entity, wherein the provisioning data comprises a data portion only for the data processing entity, and wherein the processor is further configured to encrypt the data portion using the individual encryption key.

The individual encryption and decryption key may form a cryptographic key pair, e.g. a public key and a private key of an asymmetric cryptographic scheme. However, the joint decryption key and the encryption key can be cryptographic keys according to a symmetric cryptographic scheme as well.

According to an example, the control information indicates that the individual encryption key is associated with the data processing entity. Thereby, the data provisioning device can use the correct encryption key for encryption any portion of data that is intended only for the data processing entity.

According to an example, the provisioning data comprises generic data such as the joint cryptographic key or data that are intended for all data processing entities in the set of data processing entities. The processor is configured to process the generic provisioning data for each individual data processing entity in order to obtain individual processed data, i.e. processed subdata for each data processing entity. The provisioning subdata can comprise data portions intended only for a particular data processing entity, such as firmware code or operating information or an individual identity such as a data processing entity number.

According to an example, the processor is configured to encrypt the data portion using the individual encryption key prior to encrypting the provisioning data using the joint encryption key in order to process the provisioning data. Thus, the data portion is encrypted twice with different cryptographic keys. In this way, only the data processing entity in the set of data processing entities is capable of retrieving the data portion. This enables also an individual provisioning of each data processing entity in the set of data processing entities using different data portions intended for different data processing entities which are additionally encoded with different individual encryption keys, each being associated with a different data processing entity.

According to an example, the provisioning data is digitally signed with a digital signature on the basis of a signature decryption key, wherein the data provisioning device is configured to store a corresponding signature encryption key, and wherein the processor is configured to verify the digital signature using the signature encryption key.

The digital signature can be provided by the remote provisioning data source. Thereby, the authorisation of the remote provisioning data source can be verified by the data provisioning device.

According to an example, the processor is configured to process the received provisioning data only upon successful verification of the digital signature or to discard the provisioning data if the processor has not successfully verified the digital signature.

Thereby, data provisioning upon the basis of unsigned provisioning data received from the provisioning data source can be prevented.

According to an example, the provisioning data comprises an operating system program code defining an operation of the data processing entity when executed on a processor, wherein the operating system program code is digitally signed with a digital signature on the basis of a signature encryption key, wherein the data provisioning device is configured to store a corresponding signature decryption key, and wherein the processor is configured to verify the digital signature using the signature encryption key and to process the received provisioning data upon successful verification of the digital signature, or to discard the provisioning data if the processor has not successfully verified the digital signature.

The digital signature can be provided by the remote provisioning data source. Thereby, the authorisation of a remote provisioning data source can be verified by the data provisioning device.

The operating system program code can be, e.g. a firmware.

According to an example, the data provisioning device is configured to verify the operating system program code, e.g. upon the basis of a hash value or by at least partly executing the operating program code, and to provide the operating system program code to the data processing entity only upon successful verification of the operating system program code.

According to an example, the provisioning data further comprises a rollback-parameter associated with the operating program code. The rollback-parameter can additionally indicate e.g. a version number of the operating program code. The processor can compare the rollback-parameter with a corresponding parameter, e.g. version number, of the operating program code, and discard the operating program code if the comparison indicates a difference. The processor can also include the rollback-parameter into the processed data and transmit the rollback parameter towards the data processing entity.

According to an example, the device interface is configured to transmit the encrypted processed provisioning data comprising the operating system program code only to the data processing entity or to all data processing entities.

According to an example, the data provisioning device comprises a first memory for storing the joint encryption key, and a second memory for storing the provisioning data, in particular the encrypted processed provisioning data.

The first memory and the second memory can be separated from each other.

According to an example, the data provisioning device is implemented as a hardware security module.

According to an example, the data processing entity is a first data processing entity in the set of data processing entities, wherein the set of data processing entities comprises a second data processing entity, wherein the provisioning data comprises first provisioning subdata for provisioning the first data processing entity and a second provisioning subdata for provisioning the second data provisioning entity, wherein the control information indicates the first and second data processing entity or a number of data processing entities to be provisioned in the set of data processing entities, wherein the processed provisioning data forms first processed provisioning data, wherein the encrypted processed provisioning data forms encrypted first processed provisioning data, wherein the processor is configured to process the second provisioning subdata to obtain processed second provisioning data to cryptographically encrypt the processed second provisioning data using the received joint encryption key to obtain encrypted second processed provisioning data, and wherein the device interface is configured to transmit the encrypted first processed provisioning data only to the first data processing entity and to transmit the encrypted second processed provisioning data only to the second data processing entity.

According to an example, the examples relating to provisioning the first data processing entity correspondingly apply to provisioning the second data processing entity.

According to an example, the data provisioning device is implemented to form a hardware device, in particular a portable hardware device.

According to an example, the data provisioning device is implemented in hardware as a system on a chip device.

According to a second aspect, the invention relates to a communication system, comprising one or more data provisioning devices according to the first aspect, and a provisioning data source, in particular a provisioning data server, wherein the data provisioning device and the provisioning data source are arranged in a subnetwork of a 5G communication system, in particular in a network slice, wherein the subnetwork comprises a subnetwork identifier, wherein the communication network is arranged within the subnetwork such that the provisioning data source and the data provisioning device are directly connected by the communication network, wherein the communication network is provided only for inter-subnetwork communications in the subnetwork. Thereby, a low latency connection between the provisioning data source and the one or more data provisioning devices can be established, which can be smaller than e.g. 1 ms.

The provisioning data source can have the features as described herein with respect to the first aspect of the invention.

The subnetwork identifier can be a number uniquely identifying the subnetwork or the devices or entities arranged in the subnetwork as belonging to the subnetwork. Thereby, the subnetwork as such is uniquely identifiable.

According to a third aspect, the invention relates to a provisioning method for provisioning a data processing entity from a set of data processing entities sharing the same joint decryption key, the provisioning method comprising: receiving provisioning data for provisioning the data processing entity, a joint encryption key being associated with the joint decryption key and control information, the control information indicating a processing scheme to be deployed by the provisioning method when provisioning the provisioning data from a provisioning data source by a data provisioning device that is separated from the data provisioning source, processing the provisioning data according to the control information to obtain processed provisioning data at the data provisioning device, cryptographically encrypting the processed provisioning data using the received joint encryption key to obtain encrypted processed provisioning data at the data provisioning device, and transmitting the encrypted processed provisioning data to the data processing entity by a device interface.

The provisioning method can be performed by the data provisioning device.

According to the first and second aspect, a communication between the data provisioning device and a data provisioning source can be a secure, e.g. encrypted communication. Correspondingly, a communication between the data provisioning device and a respective data provisioning entity can be a secure, e.g. encrypted communication as well.

BRIEF DESCRIPTION OF THE DRAWINGS

Further embodiments of the invention will be described with respect to the following figures, wherein.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present invention may be placed. It will be appreciated that other aspects may be utilized and structural or logical changes may be made without departing from the scope of the present invention. The following detailed description, therefore, is not to be taken in a limiting sense, as the scope of the present invention is defined by the appended claims.

For instance, it will be appreciated that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures.

Moreover, in the following detailed description as well as in the claims embodiments with different functional blocks or processing units are described, which are connected with each other or exchange signals. It will be appreciated that the present invention covers embodiments as well, which include additional functional blocks or processing units that are arranged between the functional blocks or processing units of the embodiments described below.

Figure 1A:
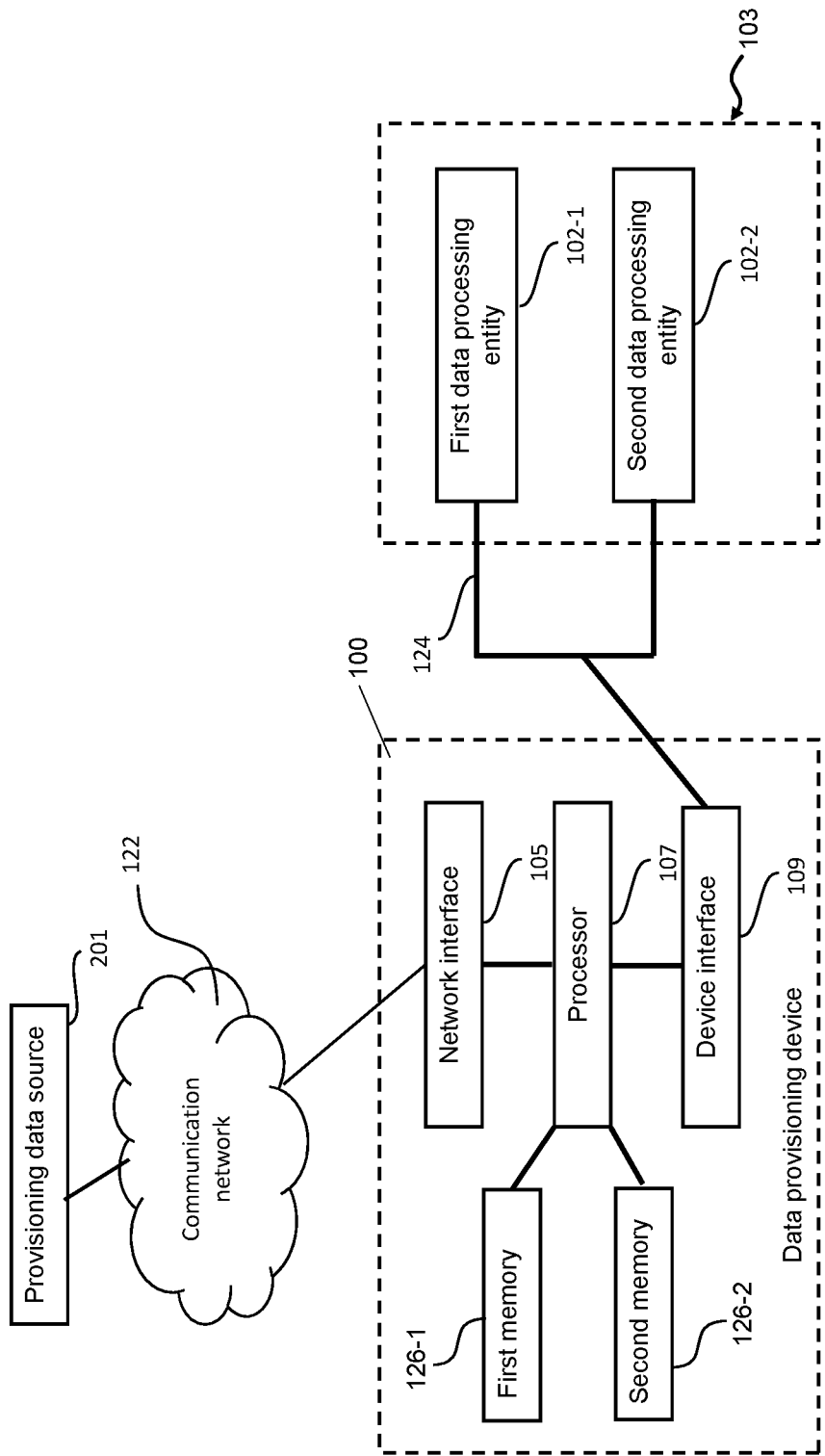
FIG. 1A shows a communication scenario with a data provisioning device.

FIG. 1A depicts a communication scenario with a data provisioning device 100 for provisioning a (first) data processing entity 102-1 from a set 103 of data processing entities sharing the same joint decryption key, and a data provisioning source 201. By way of example, the data provisioning device 100 is connected with the data provisioning source 201 over e.g. a wireless communication network 122. In an embodiment, the set of data processing entities 103 may further comprise a second data processing entity 102-2.

The data provisioning device 100 comprises a network interface 105 attachable to the e.g. wireless communication network 122, the network interface 105 being configured to receive the provisioning data for provisioning the data processing entity 102-1, a joint encryption key being associated with the joint decryption key, and control information, the control information indicating a processing scheme to be deployed by the data provisioning device 100 when provisioning the processing data entity 102-1.

A processor 107 of the data provisioning device 100 is configured to process the provisioning data according to the control information to obtain processed provisioning data and to cryptographically encrypt the processed provisioning data using the received joint encryption key to obtain encrypted processed provisioning data.

The data provisioning device 100 further comprises a device interface 109 being configured to transmit the encrypted processed provisioning data to the data processing entity 102-1, and, correspondingly, encrypted processed provisioning data to the second data processing entity 102-2.

In an embodiment, the data provisioning device 100 can be directly connected to the data processing entities 102-1, 102-2 via a communication bus 124, e.g. a serial communication bus 124.

In an embodiment, the data provisioning device 100 further comprises a first memory 126-1 and a second memory 126-2. The first memory 126-1 can be configured to store cryptographic keys, wherein the second memory 126-2 can be configured to store the provisioning data or portions thereof, such as e.g. an operating system program code.

Figure 1B:
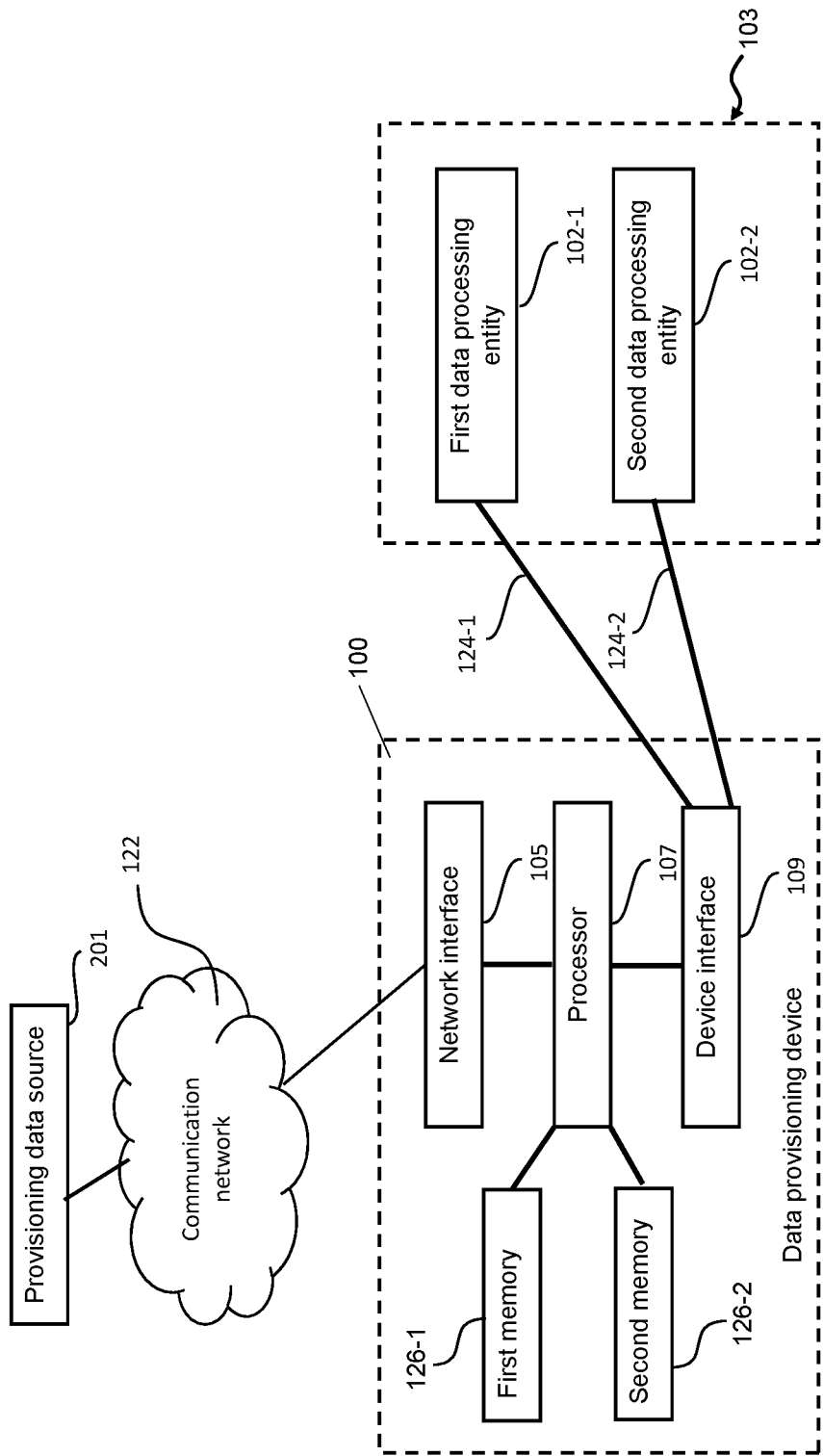
FIG. 1B shows a communication scenario with a data provisioning device.

FIG. 1B shows an embodiment of a communication scenario with the data provisioning device 100 being directly connected via connections 124-1, 124-2 to the respective data processing entity 102-1, 102-2. The connections 124-1, 124-2 can be established simultaneously or at different time instants by the device interface 109.

Figure 2:
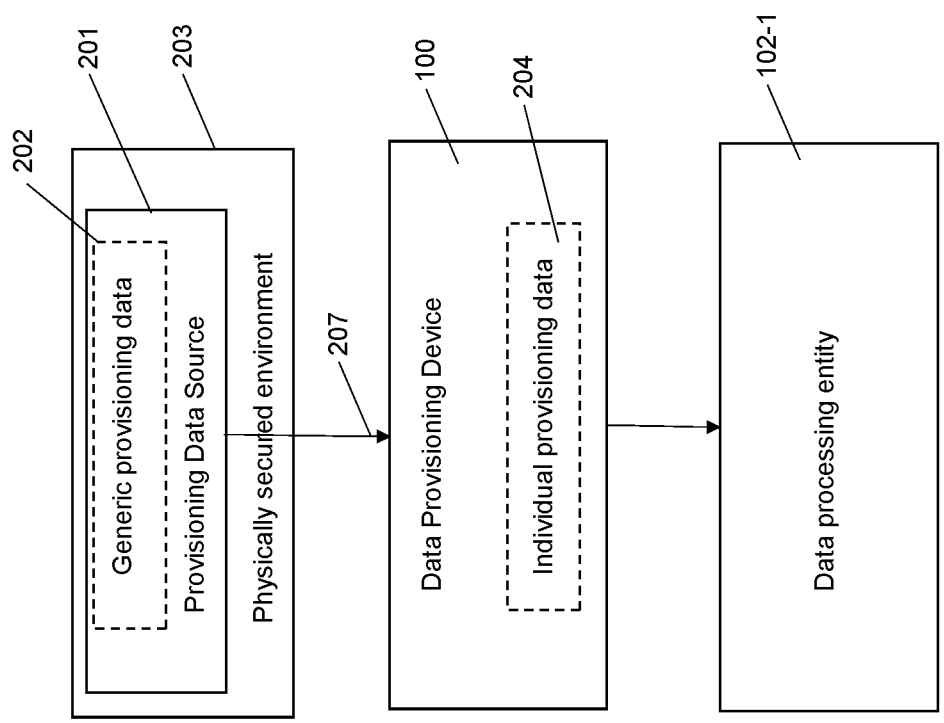
FIG. 2 shows a communication scenario with a data provisioning device.

FIG. 2 depicts a communication system with the data provisioning device 100.

As shown in FIG. 2, the provisioning data source 201 can generate generic provisioning data 202 that applies to all data processing entities 102-1, 102-x in the set 103 of data processing entities. The generic provisioning data can have a structure as described in the following section.

The provisioning data source 201 can be arranged in a physically secured environment 203, e.g. in a secured building or room.

The generic provisioning data 202 is transmitted by the provisioning data source 201 to the data provisioning device 100 via a communication link 207, which can be a secure communication tunnel.

The data provisioning device 100 processes the provisioning data in order to obtain individually processed data for each data processing entity 102-1 . . . 102-x. The individually processed provisioning data can comprise the generic information and a cryptographic key, e.g. a public key associated with a private key of the data provisioning device 100 or the provisioning data source 201, device individual information, such as a serial number, and e.g. further cryptographic keys e.g. for authentication, integrity check or secret protection for use by the respective data processing entity 102-1 . . . 102-x. The individually processed provisioning data can further comprise binding information for each data processing entity 102-1 . . . 102-x.

Figure 3:
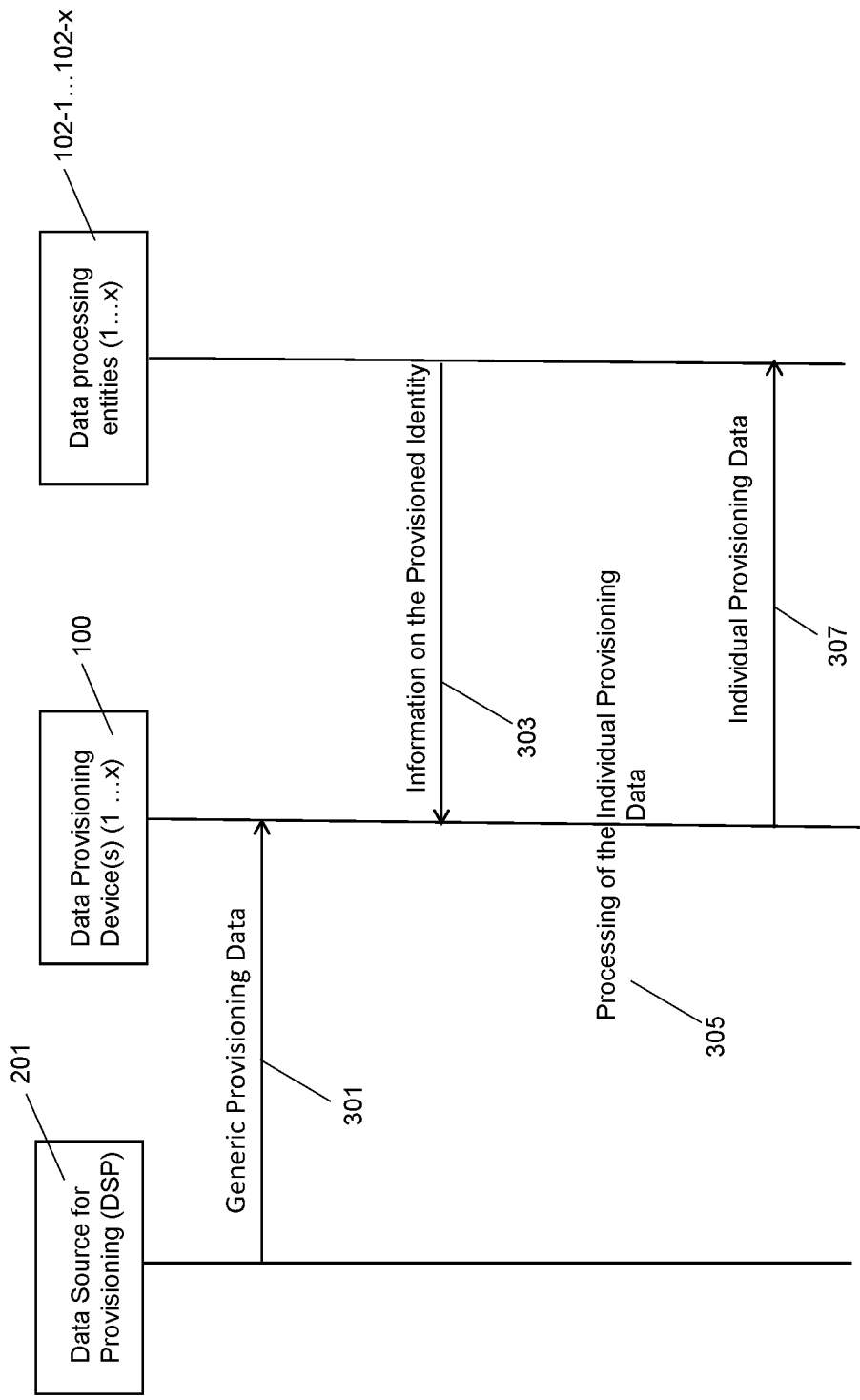
FIG. 3 shows a signal flow.

FIG. 3 depicts a signal flow according to an example. The provisioning data source 201 (data source for provisioning) transmits e.g. a generic provisioning data, which can be a data BLOB (Binary Large Object).

As exemplarily depicted in FIG. 3, one or optionally more (x) data provisioning devices 100 can be provided for provisioning one or more (x) data processing entities 102-1 . . . 102-x.

In case of one data provisioning device 100, all data processing entities 102-1 . . . 102-x are provisioned e.g. individually with individual provisioning data generated by the data provisioning device 100.

In case of an optional plurality x of data provisioning devices 100, each data provisioning device 100 may provision only one or a subset of the data processing entities 102-1 . . . 102-x in the set 103 of x data processing entities with individual provisioning data generated by the respective data provisioning device 100. The respective data provisioning device 100 communicates as described herein with the provisioning data source 201.

Optionally, the data processing entities 102-1 . . . 102-x may transmit in the step 303 information relating to the respective data processing entity 102-1 . . . 102-x, such as identity information, e.g. a serial number, or a further individual encryption key, e.g. public key, associated with an entity individual decryption key such as a private key of the respective data processing entity 102-1 . . . 102-x, to the respective data provisioning device 100. The respective data provisioning device 100 may use the individual information for individually processing and e.g. encrypting the provisioning data.

Upon reception of the e.g. generic provisioning data from the provisioning data source 201 in step 301, the respective data provisioning device 100 may individually for a data processing entity 102-1 . . . 102-x process in the step 305 the received provisioning data to obtain e.g. individual provisioning data for each data processing entity 102-1 . . . 102-x.

The generic provisioning data received from the provisioning data source 201 can be encoded or digitally signed using an encoding cryptographic key, e.g. a private key, by the provisioning data source 201. The respective data provisioning device 100 can verify the digital signature using a corresponding encryption key, e.g. a public key.

The generic provisioning data can further comprise a generic security profile for the data processing entities 102-1 . . . 102-x. The generic security profile can individually be processed or used as received by the respective data provisioning device 100, and send to the respective data processing entity 102-1 . . . 102-x.

The individually processed provisioning data is transmitted in step 307 to the respective data processing entity 102-1, 102-x.

According to an example, the received provisioning data may have a data structure comprising e.g. generic information and cryptographic keys, a placeholder for the individual device information and/or cryptographic keys as well as control information for the data provisioning device 100. The provisioning data can be digitally signed by the provisioning data source 201. The data provisioning device 100, upon verification of the digital signature, processes the received provisioning data to obtain processed provisioning data, wherein individual device data such as binding information or cryptographic keys or an individual identity, can be inserted in the data structure replacing the placeholder.

The provisioning data source 201 can generate a generic profile, which contains placeholders for cryptographic keys and information, which are device individual and can be only assigned by the data provisioning device 100. All other information i.e. keys and data, which is/are the same amongst the data processing entities 102-1 . . . 102-x in the set 103 of data processing entities, is already generated by the provisioning data source 201. This generic profile can be protected from modifications and authenticated by the provisioning data source 201 using a digital signature.

The data provisioning device 100 can use this generic information and combine it with device individual information generated in the data provisioning device 100 e.g. forming or comprising a hardware secure module (HSM) of the data provisioning device 100.

Some of this device individual information can be generated based on information derived from the respective data processing entity 102-1, . . . , 102-x to be provisioned. In addition, binding information can be generated in the HSM 100, which ensures that the generated information is only valid for a specific data processing entity 102-1, . . . , **102-*x***.

Figure 4:
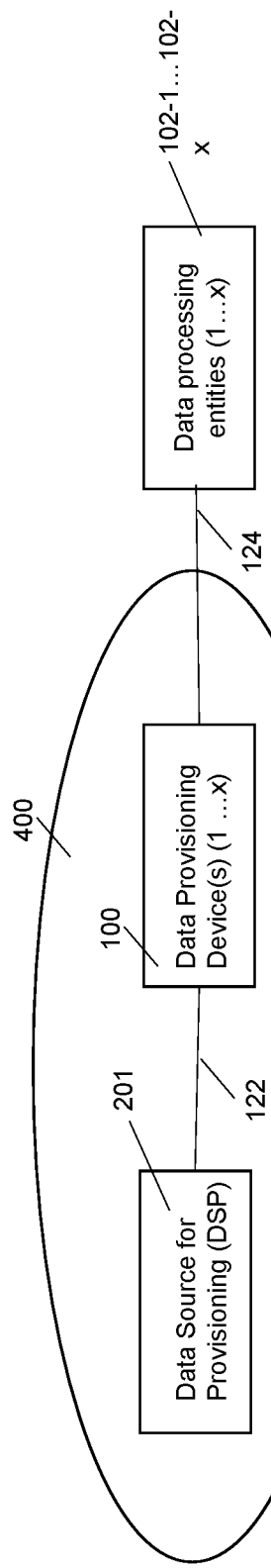
FIG. 4 shows a communication system.

FIG. 4 shows a communication system comprising one or more data provisioning devices 100 according to anyone of the preceding claims, and a provisioning data source 201, wherein the data provisioning device 100 and the provisioning data source 201 are arranged in a subnetwork 400 of a 5G communication system, in particular in a slice 400, wherein the subnetwork 400 comprises a subnetwork identifier, wherein the communication network 122 is arranged within the subnetwork 400 such that the provisioning data source 201 and the data provisioning device 100 are directly connected by the communication network 122, wherein the communication network 122 is provided only for inter-subnetwork communications in the subnetwork 400.

According to the example, the data provisioning described herein can be deployed for Desktop Provisioning at the developer's desk, for manual provisioning for e.g. mid-size volumes, e.g. 10 or 100 data processing entities 102-1 . . . **102-*x*, for data provisioning at retailers or in a shop, for provisioning in the field by a service employee or for re-provisioning for test purposes The control information can e.g. indicate that x data processing entities 102-1 . . . 102-*x*** shall be provisioned with the processed provisioning data.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. A data provisioning device for provisioning a data processing entity from a set of data processing entities sharing the same joint decryption key, the data provisioning device comprising:
   a network interface, the network interface being configured to receive the provisioning data for provisioning the data processing entity, a joint encryption key being associated with the joint decryption key, and control information, the control information indicating a processing scheme to be deployed by the data provisioning device when provisioning the data processing entity;
   a processor being configured to process the provisioning data according to the control information to obtain processed provisioning data, to cryptographically encrypt the processed provisioning data using the received joint encryption key to obtain encrypted processed provisioning data; and
   a device interface being configured to transmit the encrypted processed provisioning data to the data processing entity,
   wherein the provisioning data comprises generic provisioning data intended for all data processing entities in the set of data processing entities, wherein the processor is configured to process the generic provisioning data for each individual data processing entity in the set of data processing entities in order to obtain individual processed data comprising data portions intended only for the data processing entity; and
   wherein the data processing entity comprises an individual decryption key assigned only to the data processing entity, wherein the network interface is configured to further receive an individual encryption key associated with the individual decryption key of the data processing entity, and wherein the processor is further configured to encrypt the data portion using the individual encryption key prior to encrypting the provisioning data using the joint encryption key in order to process the provisioning data.

2. The data provisioning device of claim 1, wherein the network interface is arranged for network communications according to a network protocol, TCP, or a IP protocol, and/or wherein the device interface is arranged for device-to-device communications, as a JTAG or an USB interface or as a bus interface or as a serial bus interface.

3. The data provisioning device of claim 2, wherein the device interface is a wired interface.

4. The data provisioning device of claim 1, wherein the provisioning data comprises a public key certificate, including a root of trust certificate according to a public key infrastructure, jointly identifying all data processing entities in the set of data processing entities, and
   wherein the processor is configured to cryptographically encrypt the processed provisioning data using the public key certificate with the received encryption key to obtain the encrypted processed provisioning data.

5. The data provisioning device of claim 1, wherein the control information indicates that the individual encryption key is associated with the data processing entity.

6. The data provisioning device of claim 1, wherein the provisioning data is digitally signed with a digital signature on the basis of a signature encryption key,
   wherein the data provisioning device is configured to store a corresponding signature decryption key, and wherein the processor is configured to verify the digital signature using the signature decryption key.

7. The data provisioning device of claim 6, wherein the processor is configured to process the received provisioning data only upon successful verification of the digital signature or to discard the provisioning data if the processor has not successfully verified the digital signature.

8. The data provisioning device of claim 1, wherein the provisioning data comprises an operating system program code defining an operation of the data processing entity when executed on a digital processor,
wherein the operating system program code is digitally signed with a digital signature on the basis of a signature encryption key,
wherein the data provisioning device is configured to store a corresponding signature decryption key, and
wherein the processor is configured to verify the digital signature using the signature decryption key and to process the received provisioning data upon successful verification of the digital signature, or to discard the provisioning data if the processor has not successfully verified the digital signature.

9. The data provisioning device of claim 8, wherein the device interface is configured to transmit the encrypted processed provisioning data comprising the operating system program code only to the data processing entity.

10. The data provisioning device of claim 1, comprising a first memory for storing the joint encryption key, and a second memory for storing the provisioning data, including the encrypted processed provisioning data.

11. The data provisioning device of claim 1, wherein the data processing entity is a first data processing entity in the set of data processing entities,
wherein the set of data processing entities comprises a second data processing entity,
wherein the provisioning data comprises first provisioning subdata for provisioning the first data processing entity and second provisioning subdata for provisioning the second data processing entity,
wherein the control information indicates the first and second data processing entity or a number of data processing entities to be provisioned in the set of data processing entities,
wherein the processed provisioning data forms first processed provisioning data,
wherein the encrypted processed provisioning data forms encrypted first processed provisioning data,
wherein the processor is configured to process the second provisioning subdata to obtain processed second provisioning data and to cryptographically encrypt the processed second provisioning data using the received joint encryption key to obtain encrypted second processed provisioning data, and
wherein the device interface is configured to transmit the encrypted first processed provisioning data only to the first data processing entity and to transmit the encrypted second processed provisioning data only to the second data processing entity, or to transmit the encrypted first and second processed provisioning data to both data processing entities.

12. The data provisioning device of claim 1, being implemented to form a hardware device or a portable hardware device.

13. A communication system, comprising:
one or more data provisioning devices according to claim 1; and
a provisioning data source;
wherein the one or more data provisioning devices and the provisioning data source are arranged in a subnetwork of a 5G communication system,
wherein the subnetwork comprises a subnetwork identifier,
wherein a communication network is arranged within the subnetwork such that the provisioning data source and the data provisioning device are directly connected by the communication network,
wherein the communication network is provided only for inter-subnetwork communications in the subnetwork.

14. A provisioning method for provisioning a data processing entity from a set of data processing entities sharing the same joint decryption key, the provisioning method comprising:
receiving provisioning data for provisioning the data processing entity, a joint encryption key being associated with the joint decryption key and control information, the control information indicating a processing scheme to be deployed by the provisioning method when provisioning the provisioning data from a provisioning data source by a data provisioning device that is separated from the data provisioning source;
processing the provisioning data according to the control information to obtain processed provisioning data at the data provisioning device;
cryptographically encrypting the processed provisioning data using the received joint encryption key to obtain encrypted processed provisioning data at the data provisioning device; and
transmitting the encrypted processed provisioning data to the data processing entity,
wherein the provisioning data comprises generic provisioning data intended for all data processing entities in the set of data processing entities, wherein the processor is configured to process the generic provisioning data for each individual data processing entity in the set of data processing entities in order to obtain individual processed data comprising data portions intended only for the data processing entity; and
wherein the data processing entity comprises an individual decryption key assigned only to the data processing entity, wherein the network interface is configured to further receive an individual encryption key associated with the individual decryption key of the data processing entity, and wherein the processor is further configured to encrypt the data portion using the individual encryption key prior to encrypting the provisioning data using the joint encryption key in order to process the provisioning data.

* * * * *